TUNABLE NARROW-BAND REJECTION FILTER EMPLOYING
COHERENT DEMODULATION
Filed July 19, 1965

INVENTORS
ROBERT L. FRANK
ALAN H. PHILLIPS
BY Robert J. Haase
ATTORNEY

United States Patent Office 3,403,345
Patented Sept. 24, 1968

3,403,345

TUNABLE NARROW-BAND REJECTION FILTER EMPLOYING COHERENT DEMODULATION

Robert L. Frank, Great Neck, and Alan H. Phillips, Syosset, N.Y., assignors to Sperry Rand Corporation, Great Neck, N.Y., a corporation of Delaware Filed July 19, 1965, Ser. No. 473,000
5 Claims. (Cl. 328—165)

ABSTRACT OF THE DISCLOSURE

Two series connected chopper demodulators coupled to receive an input signal comprising desired as well as interfering signal components. One of the demodulators is driven substantially in phase with the interfering signal component and the other demodulator is driven substantially in phase quadrature with the interfering signal component. The output of the demodulators is subtractively combined with an attenuated portion of the input signal to substantially eliminate the interfering signal component.

The invention herein described was made in the course of or under a contract or subcontract thereunder, with the Department of the Air Force.

The present invention generally relates to narrow-band rejection filters and, more particularly, to such a filter employing coherent demodulation for rejecting an undesired signal having the same frequency as that of the coherent demodulator drive.

Interference between different radio communciation systems operating within the same allocated band sometimes presents a problem of serious proportions. A loran C receiver, for example, must operate in the presence of a plurality of other radio communication and/or navigation systems allocated to the frequency band which includes the loran C operating frequency of 100,000 cycles per second. The other systems include those utilizing continuous wave carriers, on-off keyed carrier signals, and frequency-shift keyed carrier signals. The nature of the remedial action to be taken to minimize interference depends largely upon the characteristics of the system to be protected. In the case of a loran C receiver, which requires a relatively broad passband of about 23 kilocycles per second, it has been found possible to reject narrow-band interfering signals without unduly distorting the loran C signal whose frequency components include the narrow-band of the interfering signal. Previous attempts to eliminate narrow-band interference in loran C receivers have centered about the use of manually tuned narrow-band (notch) filters utilizing passive circuit components.

One object of the present invention is to provide a narrow-band interference rejection filter of sharper selectivity than that conveniently achievable through the use of passive circuit components.

Another object is to provide an automatically tunable narrow-band rejection filter utilizing coherent demodulation.

A further object is to provide an automatically tunable narrow-band rejection filter utilizing coherent demodulation in which undesired signal byproducts arising from the coherent demodulation are minimized.

A further object is to provide an automatically tunable narrow-band rejection filter utilizing a plurality of tandem-connected coherent demodulating means for maximum interference rejection.

These and other objects of the present invention, as will appear from a reading of the following specification, are accomplished in a typical loran receiver species of the present invention by the provision of two series-connected, quadrature-driven coherent demodulating means to which are applied a total signal having desired and undesired frequency components. The total signal also is applied to a frequency and phase tracker which determines the frequency and the phase of the strongest signal component. The strongest signal component generally is an interfering signal rather than the desired signal due to the very low duty cycle of the desired loran signal. The frequency and phase tracker provides two output signals, one being substantially in phase with the interfering signal and the other being substantially in phase quadrature with the interfering signals.

Each coherent demodulating means comprises a chopper and at least one energy storage element which develops a direct potential in opposition to that signal component whose frequency precisely equals the chopping rate. If the chopper is driven not only at the same frequency as the interfering signal to be rejected, but also in phase with said interfering signal, a maximum direct potential is produced across the energy storage element and maximum signal rejection results.

Perfect rejection utilizing a single coherent demodulating means is not possible even with perfect frequency and phase synchronization of the chopper drive. This follows from the fact that each demodulating means inherently produces a stepped waveform (the result of remodulation of the direct potential across the energy storage element) to oppose the essentially sinusoidal interfering signal. Thus, the residual signal which results from the subtractive combination of the interfering signal and the opposing signal contains some signal energy at frequencies other than those found in the interfering signal. In addition thereto, the action of the chopper (whether it be a mechanical or an all-electronic device) introduces a small amount of extraneous signal energy. In accordance with the present invention, the residual signal can be substantially eliminated by the provision of a shunt signal path around the demodulating means in which the total input signal is attenuated and then added degeneratively with the residual signal.

The ability of a single demodulating means to cancel out a narrow-band interfering signal component depends heavily upon the attainment of a very high order of precision with which the phase of the chopper drive is matched to the phase of the interfering signal. In order to make the degree of phase control less critical, the disclosed embodiment provides a tandem-connected pair of demodulating means driven in phase quadrature with respect to each other. The chopper of the first demodulating means is driven substantially in phase with the interfering signal, and the chopper of the second demodulating means is driven in phase quadrature with respect to the interfering signal by the outputs from the frequency and phase tracker. A parallel channel is provided around both demodulating means to permit the degenerative addition of the total input signal with the residual interfering signal at the output of the second demodulating means. Thus, a high degree of narrow-band interfering signal rejection is achieved without requiring the costly attainment of a high degree of phase matching between the chopper drive signals and the interfering signal.

For a more complete understanding of the present invention, reference should be had to the following specification and to the appended figures of which:

Figure 1:
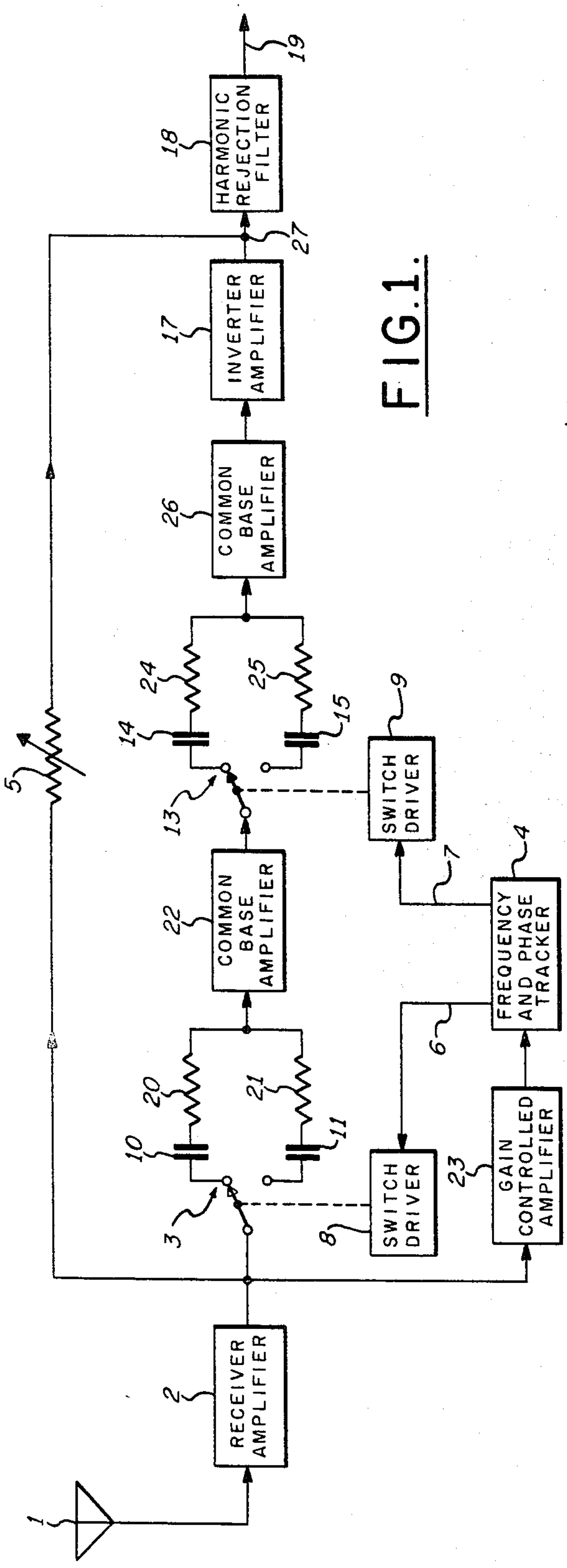
FIGURE 1 is a simplified block diagram of a preferred embodiment.

Referring to FIGURE 1, a total signal containing desired as well as undesired components is received by antenna 1. Generally speaking, in a loran receiver situation, the desired pulsed loran C signals occupy a much wider frequency spectrum than the individual interfering signals and the loran C signals have a duty cycle considerably lower than the duty cycles of the interfering signals. In a typical case, the interfering signals are narrow band and consist of continuous wave transmissions, frequency shift keyed carrier transmissions and on-off keyed carrier transmissions. The duty cycle of the first two of the aforesaid interfering signals is unity whereas the duty cycle of the last-named interfering signal is a fraction considerably in excess of the duty cycle of the loran pulse transmissions. Consequently, it can be safely presumed that the strongest signal being received is an interfering signal rather than the desired loran C signal. If the presumption is incorrect, as where only the desired loran C signal is present, the rejection filter of the present invention will center on the carrier of the loran C signals. However, the frequency components of interest in a loran C pulse are those which give rise to the leading edge. The rejection of a narrow band (7 kc.) of components centered about the carrier frequency (100 kc.) does not significantly interfere with receiver operation which depends primarily on signal components about 8 kc. beyond those rejected. Thus, the filter of the present invention is capable of reducing receiver response only with respect to narrow-band interfering signals and not with respect to the desired wide-band loran C signals.

The received signals are amplified in receiver-amplifier 2 and then applied jointly to the movable arm of chopper 3, to automatic gain controlled amplifier 23, and to the input of rheostat 5. The signal at the output of amplifier 23 is applied to frequency and phase tracker 4. The function of frequency and phase tracker 4 is to seek out the strongest received signal component and to generate a local signal whose frequency and phase are precisely determined thereby. Frequency and phase tracker 4 may be of the type described by Donald Richman in the paper "Color-Carrier Reference Phase Synchronization Accuracy in NTSC Color Television," Proceedings of the IRE, January 1954, FIG. 14, p. 117. A few relatively minor modifications of the system of Richman's FIG. 14 are desirable for optimized adaptation to the present invention. The present invention has no need for two gates. Thus, the upper synchronous detector (B–Y) should be directly connected to the upper bandpass filter and the lower synchronous detector (R–Y) should be directly connected to the lower bandpass filter. Additionally, it is desirable that the differentiating circuit (*d/dt*) be removed in favor of a set of broadband phase shifting networks of the type described by Weaver in the paper "Design of RC Wideband 90° Phase Difference Networks," Proceedings of the IRE, April 1954, which networks have a flat amplitude response over the entire passband rather than the sloping amplitude response of the differentiator of FIG. 14 of Richman. One of Weaver's networks replaces the box marked "*d/dt*" at one input of the "synch detector" of Richman. The other of Weaver's networks is put in series with the other input of the "synch detector." The flat amplitude response of the phase difference networks permits the frequency and phase tracker of Richman's FIG. 14 to bring the oscillator frequency close to the frequency of the strongest of a plurality of signal components being received. Then the phase lock loop locks the oscillator precisely to the frequency of the strongest interfering signal. The sloping amplitude characteristic of the differentiator component of Richman would cause the oscillator frequency to deviate from the frequency of the strongest interfering signal to an extent determined by the strengths and the frequencies of the other signal components that may be present at the same time. If this deviation is excessive, the phase lock loop is unable to control the oscillator in the desired manner.

Frequency and phase tracker 4 provides a pair of output signals on lines 6 and 7 for actuating switch drivers 8 and 9, respectively. The signal at the output of the oscillator of Richman's FIG. 14 corresponds to the signal on line 7 of the present invention. The signal applied to the upper (B–Y) synchronous detector of Richman's FIG. 14 corresponds to the signal on line 6 of the present invention.

The signal on line 6 drives the movable arm of chopper 3 via driver 8 so that the alternation of the chopper arm is in phase with and at the same frequency as the strongest signal component being received by antenna 1. Each stationary contact of chopper 3 is connected to the input of common base amplifier 22 by a respective path comprising a series-connected capacitor and resistor (10 and 20 or 11 and 21). The output of amplifier 22 is connected to the movable arm of chopper 13. The stationary contacts of chopper 13 are coupled via series-connected capacitor 14 and resistor 24 and series-connected capacitor 15 and resistor 25, respectively, to the input of common base amplifier 26. The output of amplifier 26 is coupled via inverter-amplifier 17 to junction 27. The output of rheostat 5 and the input to harmonic rejection filter 18 also are coupled to junction 27. Harmonic rejection filter 18 produces an output line 19 the total signal received by antenna 1 less substantially only the strongest signal component thereof which is the interfering signal to be eliminated.

In the event that movable arm 3 is driven precisely in phase with the interfering signal, capacitors 10 and 11 charge to values determined by the peak amplitude of the interfering signal. The resulting charges across capacitors 10 and 11, in turn, give rise to a square wave signal at the movable arm of chopper 3 inasmuch as said arm alternates between the oppositely charged capacitors. In effect, the structure consisting of chopper 3, capacitors 10 and 11 and resistors 20 and 21 comprises a coherent demodulating means which first coherently demodulates the signal component (interfering signal component) at the output of amplifier 2 which is at the same frequency as the chopper drive, then remodulates the resulting direct potentials across capacitors 10 and 11 into a square wave signal at said frequency, and finally subtractively combines the interfering signal and the square wave signal. The amplitude of the square wave signal is somewhat less than the amplitude of the interfering signal.

It should be noted that all signal components other than the interfering signal component are not coherent with respect to the actuation of chopper 3. Consequently, the other frequency components produce no net charge across capacitors 10 and 11 with the result that they freely pass through the demodulating means and appear at the input to amplifier 22 without significant change. The interfering signal, on the other hand, which alone gives rise to net potentials across capacitors 10 and 11, is substantially eliminated as a result of subtractive combination with the aforementioned square wave signal.

The residual signal at the input to amplifier 22 consists of all of the non-interfering signal components of the total signal received by antenna 1, the incompletely cancelled portion of the interfering signal, and the square wave signal components harmonically related to the interfering signal. The residual objectionable signal components may be substantially reduced by subtractive combination (not shown) with an attenuated portion of the signal at the output of amplifier 2. The effectiveness of the present narrow-band rejection technique depends upon the degree of phase match attained between the actuation of chopper 3 and the phase of the interfering signal. In order to make the phase alignment requirement on frequency and phase tracker 4 less severe, a second chopper demodulating means is provided to process further the signal from the first demodulating means before the residual undesired signal components are subtractively combined with the signal at the output of amplifier 2.

It can be seen that to the extent that the drive of chopper 3 is not precisely in phase with the interfering signal, a finite quadrature component of the interfering signal will pass through the first demodulating means consisting of chopper 3, capacitors 10 and 11 and resistors 20 and 21. Instead of undergoing the considerable expense of tightening the phase tracking performance of tracker 4 to the close degree that would be necessary, the quadrature component may be permitted to appear at the input and output of amplifier 22 but only to be eliminated subsequently by the action of the second demodulating means. This is the basis of operation of the preferred embodiment.

The second demodulating means consists of chopper 13, capacitors 14 and 15 and resistors 24 and 25. As previously mentioned, chopper 13 is driven in phase quadrature with respect to chopper 3 whereby the movable arm 13 is driven in phase with the quadrature component of the interfering signal at the output of amplifier 22. Said quadrature component is substantially diminished in the second demodulating means in the same manner that the in phase component of the interfering signal is substantially diminished in the first demodulating means. The residual signal at the input and output of amplifier 26 (in which both the in phase and the quadrature components of the interfering signal have been substantially diminished) is inverted in inverter-amplifier 17 and then combined with an attenuated portion of the total signal at the output of amplifier-receiver 2. Rheostat 5 is adjusted for optimum cancellation of the residual undesired signal components of the signal at the output of amplifier 17. The components which are harmonically related to the interfering signal and generated by the modulating action of choppers 3 and 13 are eliminated by harmonic rejection filter 18. There is finally produced on line 19 a signal containing substantially only the noninterfering signal components of the total signal received by antenna 1.

Figure 2:
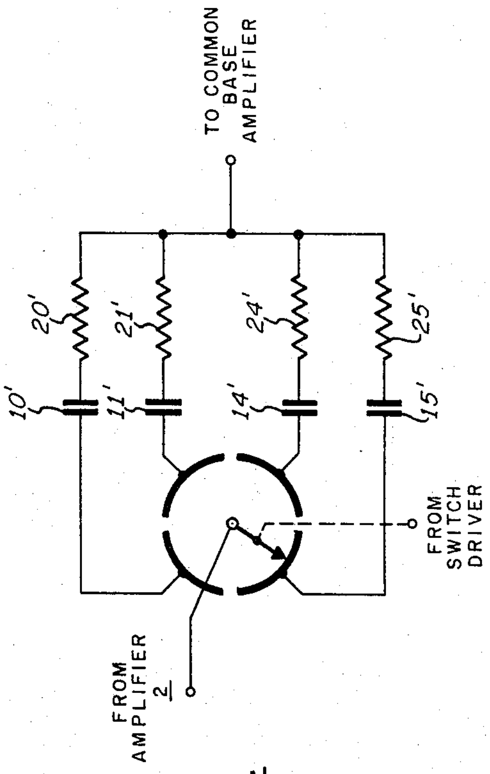
FIGURE 2 is a schematic diagram of an alternative coherent demodulating means which may be substituted for the pair of coherent demodulating means of FIGURE 1.

The use of two common base amplifiers, such as amplifiers 22 and 26 of FIGURE 1, is not a necessary feature of the present invention. Alternatively, the outputs of all four energy storage elements can be connected to the same current summation point as in the species of FIGURE 2. Referring to FIGURE 2, the four reactive networks 10′, 20′ and 11′, 21′ and 14′, 24′ and 15′, 25′ are connected to the same common base amplifier (and thence to a junction corresponding to junction 27 of FIGURE 1). The chopper drive requirements of FIGURE 2 are somewhat different from those of FIGURE 1. Whereas one of the contacts of chopper 3 and one of the contacts of chopper 13 of FIGURE 1 are closed at the same time so as to provide a signal path through both demodulating means at all times, only one of the contacts of the chopper of FIGURE 2 is closed at any given time. Each contact of FIGURE 1 is closed for a time equaling half the period of the interfering signal. Each contact of FIGURE 2 is closed for a respective quarter of said period.

It will be noted by those skilled in the art that the capacitive energy storage elements of FIGURES 1 and 2 may be replaced by inductive energy storage elements through the use of well-known circuit duality principles. The particular nature of the energy storage elements employed is not of basic importance in the present invention.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is.

1. A narrow-band rejection filter comprising
first coherent demodulating means coupled to receive a narrow-band interfering signal,
means for driving said first coherent demodulating means with a signal having substantially the same frequency and substantially the same phase as said interfering signal, and
means for subtractively combining the output signal from said first coherent demodulating means with said interfering signal,
said means for subtractively combining including second coherent demodulating means coupled to the output of said first coherent demodulating means, said second coherent demodulating means being driven substantially in phase quadrature with respect to said first demodulating means.

2. An automatically tunable narrow-band rejection filter comprising
coherent demodulating means coupled to receive a narrow-band interfering signal,
a frequency and phase tracker coupled to receive said interfering signal for providing a driving signal having substantially the same frequency and substantially the same phase as said interfering signal,
said driving signal being applied to said coherent demodulating means, and
means for subtractively combining the output signal from said coherent demodulating means with said interfering signal.

3. An automatically tunable narrow-band rejection filter comprising
first coherent demodulating means coupled to receive a narrow-band interfering signal.
second coherent demodulating means coupled to the output of said first coherent demodulating means,
a frequency and phase tracker coupled to receive said interfering signal for providing first and second driving signals, said first driving signal having substantially the same frequency and substantially the same phase as said interfering signal, said second driving signal being substantially in phase quadrature with said first driving signal,
said first and second driving signals being applied to said first and second coherent demodulating means, respectively, and
means for subtractively combining the output signal from said second coherent demodulating means with said interfering signal.

4. A narrow-band rejection filter comprising
a coherent demodulating means having an input terminal and an output terminal and including a chopper and a plurality of capacitors sequentially connected between said input and output terminals by said chopper,
said input terminal of said coherent demodulating means being coupled to receive a narrow-band interfering signal,
means for driving said chopper with a signal having a frequency and phase determined by the frequency and phase of said interfering signal, and
means for subtractively combining the signal at the output terminal of said coherent demodulating means with said interfering signal.

5. A narrow-band rejection filter comprising
a coherent demodulating means having an input terminal and an output terminal and including a chopper and a pair of capacitors sequentially connected between said input and output terminals by said chopper,
said input terminal of said coherent demodulating means being coupled to receive a narrow-band interfering signal,
means for driving said chopper with a signal having substantially the same frequency and substantially the same phase as the frequency and phase of said interfering signal whereby opposite polarity charges are produced on said capacitors in accordance with the peak amplitude of the carrier of said interfering signal, and means for subtractively combining the output signal from said coherent demodulating means with said interfering signal.

References Cited

UNITED STATES PATENTS

| | | | |
|---|---|---|---|
| 1,743,124 | 1/1930 | Esau et al. | 325—378 |
| 3,226,646 | 12/1965 | Ludwig | 325—475 |
| 3,241,077 | 3/1966 | Smyth et al. | 328—165 |
| 3,327,227 | 6/1967 | Sykes et al. | 328—167 XR |

ARTHUR GAUSS, *Primary Examiner.*

J. ZAZWORSKY, *Assistant Examiner.*